(12) United States Patent
Rey et al.

(10) Patent No.: US 8,027,669 B2
(45) Date of Patent: Sep. 27, 2011

(54) OPTIMIZED TRANSMISSION OF TEXT SAMPLE FORMAT DESCRIPTION FOR STREAMING TIMED TEXT

(75) Inventors: Luis Jose Rey, Darmstadt (DE); Rolf Hakenberg, Darmstadt (DE)

(73) Assignee: Panasonic Corporation, Osaka (JP)

( * ) Notice: Subject to any disclaimer, the term of this patent is extended or adjusted under 35 U.S.C. 154(b) by 1097 days.

(21) Appl. No.: 10/577,704

(22) PCT Filed: Oct. 12, 2004

(86) PCT No.: PCT/EP2004/011424
§ 371 (c)(1),
(2), (4) Date: Oct. 4, 2006

(87) PCT Pub. No.: WO2005/046159
PCT Pub. Date: May 19, 2005

(65) Prior Publication Data
US 2007/0123236 A1    May 31, 2007

(30) Foreign Application Priority Data
Nov. 6, 2003  (EP) .................................... 03025482

(51) Int. Cl.
*H04L 29/08* (2006.01)
*H04M 11/00* (2006.01)
(52) U.S. Cl. ................. 455/414.4; 379/88.13; 379/88.14
(58) Field of Classification Search ................ 455/414.1
See application file for complete search history.

(56) References Cited

OTHER PUBLICATIONS

'RTP Payload Format for 3GPP Timed Text, draft-rey-avt-3gpp-timed-text-01.txt' IETF Internet Draft, Sep. 2003.*
'Extended RTP Profile for RTCP-based Feedback (RTP/AVPF), draft-ietf-avt-rtcp-feedback-07.txt' Internet-Draft, Jun. 6, 2003.*
PCT International Search Report dated Mar. 14, 2005.
J. Rey, et al.; "RTP Payload Format for 3GPP Timed Text," draft-rey-avt-3gpp-timed-text-01.text IETF Internet Draft, Sep. 2003, pp. 1-32, XP002278227.
Ott J., et al.; "Extended RTP Profile for RTCP-based Feedback," (RTP/AVPF); draft-ietf-avt-rtcp-feedback-07.txt IETF Internet Draft, XX, XX, Jun. 6, 2003, pp. 1-51, XP002276758.
Friedman T. et al.; "RTP Control Protocol Extended Reports (RTCP XR), draft-ietf-avt-rtcp-report-extns-06.txt" IETF Internet Draft, XX, XX, May 19, 2003, pp. 1-53, XP002276759.

(Continued)

*Primary Examiner* — Patrick Edouard
*Assistant Examiner* — Huy Ho
(74) *Attorney, Agent, or Firm* — Dickinson Wright PLLC

(57) ABSTRACT

The present invention relates to a method for transmitting formatted text from a streaming server 100 to a mobile client 101 using an RTP protocol in a mobile communication system. The formatted text comprises at least one text sample having an associated text sample format description. Further; the present invention relates to the streaming server 100 transmitting the formatted text, the mobile client 101 receiving a streamed formatted text and to a streaming system. To reduce the transmission overhead of conventional systems when transmitting streamed text in a wireless communication system, such as UMTS, using RTP, the streaming server 100 transmits only text sample format descriptions that are not already provided for a earlier text samples to the mobile client 101 when processing a text sample to be transmitted. The server maintains information on the text sample format descriptions transferred to the client in order to determine which of the text sample format descriptions have already been provided.

29 Claims, 3 Drawing Sheets

OTHER PUBLICATIONS

"Technical Specification 3rd Generation Partnership Project; Technical Specification Group Services and System Aspects Transparent end-to-end packet switched streaming services (PSS); Timed text format (Release 6) 3GPP TS 26.245 V0.1.6 (Jul. 17, 2003)" 3GPP, Mar. 17, 2003, pp. 1-18, XP002278228, Sophia Anitpolis.

"Universal Mobile Telecommunications Systems (UMTS); Transparent end-to-end streaming service; protocols and codecs," 3GPP TS 26.234 version 5.6.0 Release 5, Sep. 2003, pp. 1-87.

H. Schulzrinne, et al., "RTP: A Transport Protocol for Real-Time Applications," RFC 3550, Jul. 2003, pp. 1-93.

H. Schulzrinne. et al,, "RTP Profile for Audio and Video Conferences with Minimal Control," RFC 3551, Jul. 2003, pp. 1-40.

J. Postel, "User Datagram Protocol," RFC 768, Aug. 1980, p. 1-3.

G. Hellstrom, "RTP Payload for Text Conversation," RFC 2793, May 2000, p. 1-10.

English translation of Z. Jing, et al., "The Performance Difference Analysis Between Go Back n Protocol and Selective Repeat Protocol," Communications Technology, No. 1, Jan. 2003, pp. 1-7.

Chinese Office Action dated Dec. 26, 2008 with English translation.

Z. Jing, et al., "The Performance Difference Analysis Between Go Back n Protocol and Selective Repeat Protocol," Communications Technology, No. 1, Jan. 2003, pp. 70-72, 88.

* cited by examiner

```
+-+-+-+-+-+-+-+-+-+-+-+-+-+-+-+-+-+-+-+-+-+-+-+-+-+-+-+-+-+-+-+-+
| entry count    | SIDX #1 (variable)    | SPLATTR #1 (var.)   |
+-+-+-+-+-+-+-+-+-+-+-+-+-+-+-+-+-+-+-+-+-+-+-+-+-+-+-+-+-+-+-+-+
|   SIDX #2  (variable)   | SPLATTR #2 (variable.) |...........:
+-+-+-+-+-+-+-+-+-+-+-+-+-+-+-+-+-+-+-+-+-+-+-+-+-+.............+
:                                                              :
:                                                              :
:                                                              :
+-+-+-+-+-+-+-+-+-+-+-+-+-+-+-+-+-+-+-+-+-+-+-+-+-+-+-+-+-+-+-+-+
```

Fig. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| | | | | | | | |       |F|F|F|T|                              |
|R|D|H|V|B|T|S|F|   R   |I|S|S|C|         displayFlags         |
| | | | | | | | |       |D|F|Z|R|                              |
+-+-+-+-+-+-+-+-+-+-+-+-+-+-+-+-+-+-+-+-+-+-+-+-+-+-+-+-+-+-+-+-+
|         displayFlags          |   hor. just.  |  vert. just. |
+-+-+-+-+-+-+-+-+-+-+-+-+-+-+-+-+-+-+-+-+-+-+-+-+-+-+-+-+-+-+-+-+
|                       background color                       |
+-+-+-+-+-+-+-+-+-+-+-+-+-+-+-+-+-+-+-+-+-+-+-+-+-+-+-+-+-+-+-+-+
|                       default text box                       |
+-+-+-+-+-+-+-+-+-+-+-+-+-+-+-+-+-+-+-+-+-+-+-+-+-+-+-+-+-+-+-+-+
|                       default text box                       |
+-+-+-+-+-+-+-+-+-+-+-+-+-+-+-+-+-+-+-+-+-+-+-+-+-+-+-+-+-+-+-+-+
|                        default style                         |
+-+-+-+-+-+-+-+-+-+-+-+-+-+-+-+-+-+-+-+-+-+-+-+-+-+-+-+-+-+-+-+-+
|                        default style                         |
+-+-+-+-+-+-+-+-+-+-+-+-+-+-+-+-+-+-+-+-+-+-+-+-+-+-+-+-+-+-+-+-+
|                        default style                         |
+-+-+-+-+-+-+-+-+-+-+-+-+-+-+-+-+-+-+-+-+-+-+-+-+-+-+-+-+-+-+-+-+
|                          font table                          |
+-+-+-+-+-+-+-+-+-+-+-+-+-+-+-+-+-+-+-+-+-+-+-+-+-+-+-+-+-+-+-+-+
|                          font table                          |
+-+-+-+-+-+-+-+-+-+-+-+-+-+-+-+-+-+-+-+-+-+-+-+-+-+-+-+-+-+-+-+-+
|          font table           |
+-+-+-+-+-+-+-+-+-+-+-+-+-+-+-+-+
```

Fig. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      0x02     |SIDX#1=0x01    |SPLATTR#1=0x00 | SIDX#2=0x02   |
+-+-+-+-+-+-+-+-+-+-+-+-+-+-+-+-+-+-+-+-+-+-+-+-+-+-+-+-+-+-+-+-+
|SPLATTR #2=0x18|     0x00      |     0x00      |
+-+-+-+-+-+-+-+-+-+-+-+-+-+-+-+-+-+-+-+-+-+-+-+-+
```

Fig. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|F|0|0|0|0|0|1|0|SIDX#1=0x01    |SPLATTR#1=0x00 | SIDX#2=0x02   |
+-+-+-+-+-+-+-+-+-+-+-+-+-+-+-+-+-+-+-+-+-+-+-+-+-+-+-+-+-+-+-+-+
|SPLATTR #2=0x18|     0x00      |     0x00      |
+-+-+-+-+-+-+-+-+-+-+-+-+-+-+-+-+-+-+-+-+-+-+-+-+
```

Fig. 5

OPTIMIZED TRANSMISSION OF TEXT SAMPLE FORMAT DESCRIPTION FOR STREAMING TIMED TEXT

FIELD OF INVENTION

The present invention relates to a method for transmitting formatted text from a streaming server to a mobile client using an RTP protocol in a mobile communication system. The formatted text may comprise at least one text sample having an associated text sample format description. Further, the present invention relates to the streaming server transmitting the formatted text, the mobile client receiving a streamed formatted text and to a system comprising the streaming server and the mobile client.

BACKGROUND ART

The 3GPP (3$^{rd}$ Generation Partnership Project) adopts IETF (Internet Engineering Task Force) standardized protocols like RTP, UDP, IP for the transport and packet-switch codecs like AMR (Adaptive Multi-Rate) and H.264 (MPEG 4 part 10) for encoding media. The 3GPP Packet Switched Streaming Services (see "Universal Mobile Telecommunications System (UMTS); Transparent end-to-end streaming service; Protocols and codecs", 3GPP TS 26.234 version 5.6.0 Release 5, September 2003, available at http://www.3gpp.org) use the RTP/UDP protocol stack to stream audio/video/text media.

RTP is a Real-Time Transport Protocol (see Schulzrinne et al., "RTP: A Transport Protocol for Real-Time Applicatons", RFC 3550, July 2003, all RFCs available at http://www.ietf.org) which is mainly used for real-time or near real-time communication, i.e. communication with relaxed delay constraints. It provides information on the timing of the media it carries and also allows re-ordering and re-assembling at the receiver.

An integrated part of the protocol is RTCP (Real Time Control Protocol) which provides minimal reception information and loose group membership. RTP is generally used together with the RTP/AVP profile (see Schulzrinne et al., "RTP Profile for Audio and Video Conferences with Minimal Control", RFC 3551, July 2003) which defines the use of the RTP header fields and mapping tables for payload types, besides simple RTCP feedback timing rules.

UDP (Postel, "User Datagram Protocol", RFC 768, August 1980) is the User Datagram Protocol used to transport RTP packets. UDP is commonly used when an unreliable communication is appropriate for the given media, as is the case for streaming applications. The protocol stack RTP/UDP is used because the timing constraints of the media don't usually allow reliable communication, e.g. by using TCP (Transmission Control Protocol).

In RTP, packetization schemes (payload formats) for existing media formats (codecs) are specified in the Internet Engineering Task Force Audio/Video Transport Working Group (IETF AVT WG). There is, for example, a payload format for AMR encoded speech data, and another one for H.264 video.

The payload format defined in Helistrom, "RTP Payload for Text Conversation", RFC 2793, May 2000, may be used to transmit conversational text but the format does not allow carrying any additional information on the decoration of the text characters. The decoration is for example the font used, the background color, the scroll or the karaoke movement. It does not allow spatial synchronization with other media, like it is needed e.g. for subtitling of video sequences. In summary, the 3GPP timed text (see 3GPP TS 26.234, in particular Appendix D.8a) offers a much wider range of functionalities which is not supported by other standardized codecs.

Rey et al., "RTP Payload Format for 3GPP Timed Text", draft-ray-avt-3gpp-tt-01.txt, IETF AVT WG, September 2003, available at http://www.ietf.org suggests a payload format for the transmission of timed text using RTP. However, the payload format provides solely means for out-of-band transmission of sample description information and does not address the problem of in-band transmission of sample description information in detail. The in-band transmission of sample description suggested by Rey et al. requires transmitting each sample description together with its associated text sample and therefore can not solve the problems outlined below.

In the present invention, in-band may be understood in the context of a signaling channel. In general, the sample descriptions represent pure signaling information or metadata. The text may be considered the actual data. Thus in-band means that the signaling, i.e. the sample descriptions, is transmitted in the same session as the data, i.e. the text samples. Please note that the text samples do not contain SPLDESC, THDR or FHDR headers, just text strings and modifier boxes (see 3GPP TS 26.234) are transmitted. Out-of-band signaling may be therefore understood as sending the sample description using another session or protocol than the one used for transmitting the data, e.g. SDP.

When streaming 3GPP Timed Text, it is typically the case that the steamed text samples refer to one and the same sample description entries. After a given amount of time all the possible sample descriptions have already been transmitted at least once. The text samples repeatedly refer to these sample descriptions and so the sample descriptions must be transferred over and over again from sender to receiver since the sender does not know which packets were received by the receiver. Further, 3GPP TS 26.234 and the method proposed In Rey et al., "RTP Payload Format for 3GPP Timed Text" both require that each text sample is always transmitted along with its associated sample description. Hence, in conventional systems the transmission overhead due to transmitting, all sample descriptions of a 3GPP file is large. Further, this overhead is especially undesirable in case of providing streaming to a mobile client over a radio link scarce in its resources.

SUMMARY OF THE INVENTION

Hence, the object of the present invention is to reduce the transmission overhead of conventional systems when transmitting streamed text from a streaming server to a mobile terminal or client in a wireless communication system, such as UMTS, using RTP.

The object of the present invention is solved by the subject matter of the independent claims. Preferred embodiments of the present invention are subject matter to the dependent claims.

According to a first embodiment of the present invention, a method for transmitting formatted text from a streaming server to a mobile client using an RTTP protocol in a mobile communication system is provided. The formatted text may comprise at least one text sample having an associated text sample format description. The streaming server may determine whether a text sample format description for a text sample to be transmitted has already been provided for an earlier text sample. If so, only the text sample to be transmitted may be added to at least one data packet to be transmitted. If not, the text sample to be transmitted and its associated text sample format description may be added to at least one data packet to be transmitted. The at least one data packet may then be transmitted to the mobile client.

According to this embodiment, the streaming server preparing a formatted text e.g. from a 3GPP file may analyze the text sample format descriptions of the different text samples prior to transmission. In this processing the streaming server may determine which of the sample descriptions have already been transmitted to the client or which of them may have been already been-added to (an) RTP packet(s) to be transmitted to the client. Depending on this determination process, the streaming server may not need to include the text sample format descriptions in data packets in case same have been already provided. Hence, the transmission overhead may be reduced, as a (re)transmission of duplicated information may be prevented.

Further, it should be noted that is also possible that a data packet comprises at least text one sample format description only. E.g. in case the maximum size for a single data packet is already reached by the at least one text sample format description included, no additional text samples may be present therein. Hence, the different embodiments of the present invention as outlined in the following paragraphs may also be applicable when data packets only comprise text sample format descriptions.

There may be two possibilities in which the streaming server may not transmit the text sample format description of a text sample to be transmitted: The text sample format description already provided has either been transmitted to the mobile client in an earlier data packet or the text sample format description already provided has already been added to the at least one data packet when processing an earlier text sample.

When adding the text sample to be transmitted to at least one data packet, the streaming server may further add at least one sample identifier to the at least one data packet. The sample identifier may provide a mapping between a text sample format description and its associated text sample in the at least one data packet. Hence, by using an identifier, each text sample may be correlated to a text sample format description.

According to a further embodiment of the present invention, the streaming server may maintain information on text sample format descriptions provided to the mobile client in the transmitted data packets. The maintained information may comprise data on the provided text sample format descriptions, data on the at least one data packet in which the text sample format description has been transmitted, and the at least one identifier.

If it has been determined that a text sample format description for a text sample to be transmitted has already been provided for an earlier text sample it may be necessary to determine, which of the data packets transmitted to the client included the text sample format description. The information maintained in the streaming server may be used to determine the at least one transmitted data packet since same may comprise information on the text sample format descriptions transmitted and the data packet(s) in which same have been transmitted or will be transmitted.

If the streaming server determined that a text sample format description for a text sample to be transmitted has already been provided for an earlier text sample, i.e. in this case has already been transmitted to a client, it may be desirable to check, whether the at least one data packet comprising the text sample format description has been acknowledged by the mobile client. If so, the sample identifier used in the determined at least one data packet for mapping the text sample to be transmitted to a provided text sample format description may be reused. i.e. the sample identifier used for the already transmitted text sample format description may be associated to the text sample to be transmitted and may be included into the at least one data packet in which the text sample to be transmitted will be included.

If it has been determined that the determined at least one data packet has not been acknowledged by the mobile client, the text sample to be transmitted and its associated text sample format description may both, be added to the at least one data packet, since it can not be ensured that the mobile client has successfully received the necessary text sample format description in the data packet(s) transmitted earlier.

Further, the at least one data packet may comprise a header and a payload section. The header of a data packet may comprise the reused identifier, if it has been determined that a text sample format description for a text sample to be transmitted has already been provided for an earlier text sample. In this exemplary embodiment of the present invention, a header in an RTP packet may comprise the sample identifier used for a text sample format description to indicate the text sample format description's reuse to the receiving client. Further, the text sample requiring the format specified in the text sample format description may also be associated to the same identifier, such the client may map the text sample to its associated text sample format description.

Moreover it should be noted that at least one data packet may comprise a plurality of text samples and text sample format descriptions. It should be understood that a single data packet may comprise only a single text sample and/or text sample format description or even only fragments thereof. Likewise, a single data packet may comprise a plurality of text samples and/or text sample format descriptions.

If it has been determined that a text sample format description for a text sample to be transmitted has not already been provided for an earlier text sample, the header of a data packet may comprise at least one sample identifier and at least one text sample format description.

In the alternative case, the header of a data packet may comprise at least one sample identifier since the text sample format description may be omitted as it has been provided earlier to the client.

As indicated above, the at least one data packet comprises a header and a payload section. Further, the payload section may comprise at least one sample identifier and at least one text sample. Hence, by the association of the sample identifier and the text sample of the payload section and the usage of said sample identifier for a text sample format description a mapping may be performed by the client to correctly format the text sample.

The determination whether a text sample format description for a text sample to be transmitted has already been provided for an earlier text sample may be based e.g. on the maintained information.

Another embodiment of the present invention addresses the memory management for caching the sample description information in the client to control the memory size needed for caching. To reduce the size of required memory, only a predetermined number of identifiers may be used. Hence, if it has been determined that a text sample format description for a text sample to be transmitted has not already been provided for an earlier text sample and if all available identifiers are used for mapping text samples to text sample format descriptions, an sample identifier may reused for the provision of a new text sample format description and the corresponding text sample to the mobile client.

Accordingly it is of advantage that the maintained information on provided text sample format descriptions may be updated upon reuse of an identifier.

To decide which sample identifier should be reused, the maintained information may further comprise a time stamp for each sample identifier indicating the latest insertion of the sample identifier into a transmitted data packet Hence, according to another embodiment of the present invention, the sample identifier with the earliest time stamp may be reused for the transmission of a new text sample format description to the mobile client.

Further, it should be noted that the at least one data packet may only comprise at least one text sample format description.

In another embodiment, the present invention provides a streaming server in a mobile communication system transmitting formatted text to a mobile client using the RTP protocol. The formatted text may comprise at least one text sample having an associated text sample format description. The streaming server may comprise a packet forming means for forming at least one data packet, a processing means for determining whether a text sample format description for a text sample to be transmitted has already been provided for an earlier text sample, and a transmission means for transmitting the at least one data packet to the mobile client.

The packet forming means may be adapted to add the text sample to be transmitted to at least one data packet to be transmitted, if the processing means has determined that a text sample format description for a text sample to be transmitted has already been provided for an earlier text sample. Further, the packet forming means may be adapted to add the text sample to be transmitted and its associated text sample format description to at least one data packet to be transmitted, if the processing means has determined that a text sample format description for a text sample to be transmitted has not already been provided for an earlier text sample.

Moreover, the streaming server may be adapted to perform the method according to the different embodiments as described above.

In a further embodiment of the present invention, a method for operating a mobile client in a mobile communication system to receive formatted text from a streaming server using the RTP protocol is provided. Again, the formatted text may comprise at least one text sample having an associated text sample format description. The mobile client may receive at least one data packet from the streaming server, wherein the at least one data packet may comprise at least one text sample. Next, the client may determine whether for a respective one of the at least one text samples, the at least one data packet further comprises at least one associated text sample format description.

If so, the client may select the associated text sample format description for the respective text sample comprised in the at least one data packet directly from the data packet. If not, a text sample format description for the respective text sample may be selected from text sample format descriptions already available at the mobile client, as it may be assumed or indicated to the client that the required sample description has already been provided to the client earlier. Upon having selected the appropriate format, i.e. text sample format description, the respective text sample may be formatted using the selected text sample format description.

According to a further embodiment the at least one data packet further comprises at least one sample identifier mapping at least one text sample to its associated text sample format description.

In order to be able to provide the appropriate mapping of text samples to text sample format, description (received earlier) the client may maintain information on the text sample format descriptions provided in received data packets. The maintained information may therefore comprise data on the provided at least one text sample format description, and its at least one sample identifier to be able to perform the mapping to text samples.

When selecting the associated text sample format description for a text sample, the sample identifier associated to the text sample may be used to identify the associated text sample format description in the at least one data packet or in text sample format descriptions already available at the mobile client.

In case the client receives a new text sample format description associated with an sample identifier that is already associated to another text sample format description in the maintained information, the maintained information may be updated based on a new text sample format description.

To allow the streaming server to determine whether a text sample form, at description has successfully received by the mobile client, same may acknowledge the at least one received data packet.

Further, a data packet received by the mobile client may comprise only at least one text sample format description and the mobile client may store the at least one text sample format description received. Hence, it may be also possible to transmit/receive packets comprising sample descriptions only and to store same for later use when formatting an associated text sample.

Another embodiment of the present invention relates to a mobile client for receiving formatted text from a streaming server using the RTP protocol. The mobile client may comprise receiving means for receiving at least one data packet from the streaming server, wherein the at least one data packet comprises at least one text sample, processing means for determining whether for a respective one of the at least one text samples, wherein the at least one data packet further comprises at least one associated text sample format description, and text formatting means for formatting the respective text sample using the selected text sample format description.

The selection means may be adapted to select the associated text sample format description for the respective text sample comprised in the at least one data packet, if it is determined that for a respective one of the at least one text samples, the at least one data packet further comprises at least one associated text sample format description. Further, the selection means may be adapted to select a text sample format description for the respective text sample from text sample format descriptions already available at the mobile client, if it is determined that for a respective one of the at least one text samples, the at least one data packet does not comprises at least one associated text sample format description.

Moreover, the mobile client may be adapted to perform the different embodiments of the method as described above.

According to a further embodiment, the present invention provides a streaming system comprising at least one streaming server and at least one mobile client.

BRIEF DESCRIPTION OF THE FIGURES

In the following the present invention is described in more detail in reference to the attached figures and drawings. Similar or corresponding details in the figures are marked with the same reference numerals.

FIG. 2 shows a payload header format for RTP according to one embodiment of the present invention, FIG. 3 shows a sample description field of the payload header shown in FIG. 2 according to one embodiment of the present invention, FIG. 4 shows the payload header format for RTP according to FIG. 2 having a reused text sample format description and a text sample format description included in the header according to one embodiment of the present invention, and FIG. 5 shows an enhanced version of payload header format for RTP shown in FIG. 3 according to one embodiment of the present invention.

DETAILED DESCRIPTION

Figure 1:
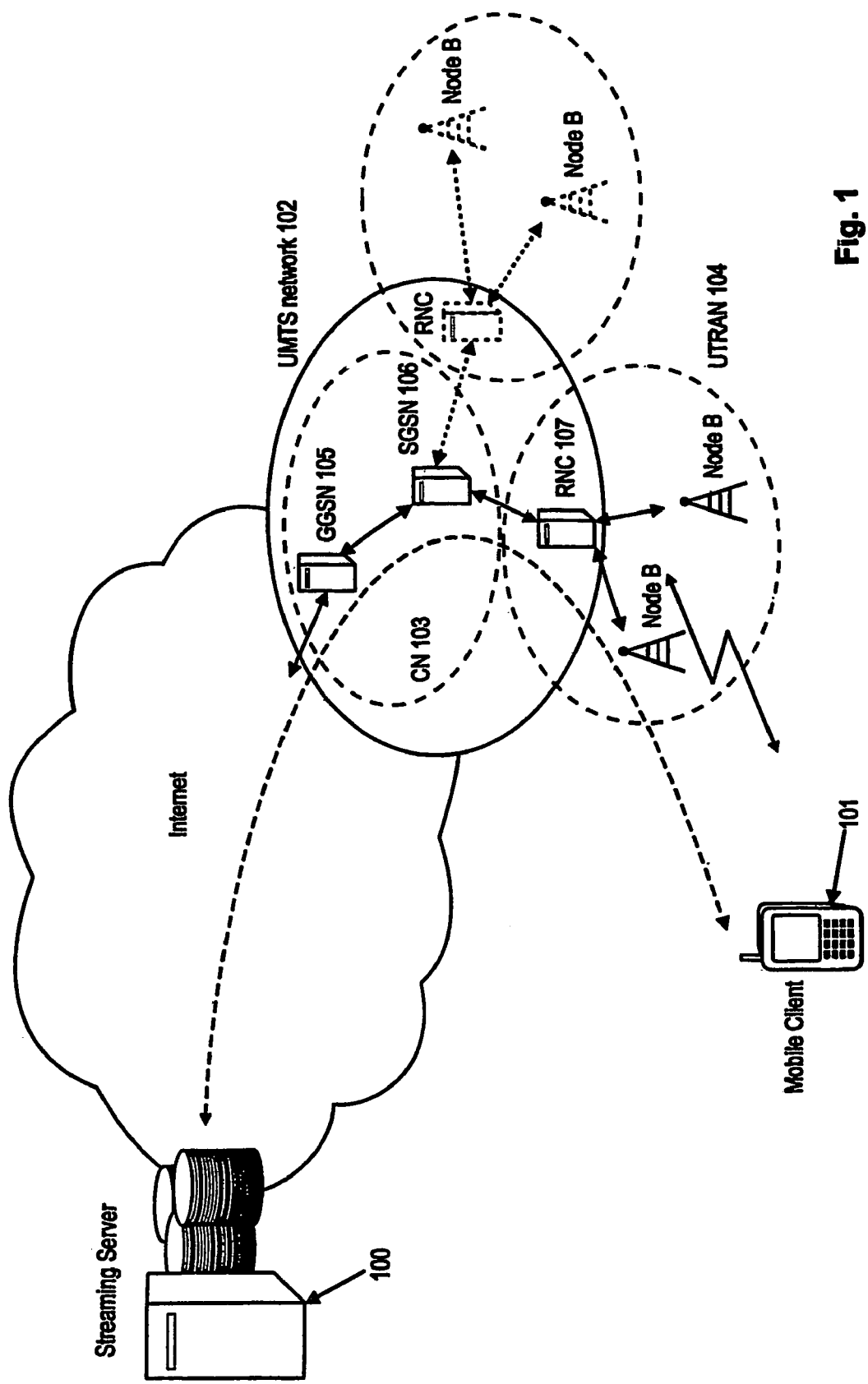
FIG. 1 shows an architectural overview over the streaming system according to one embodiment of the present invention.

Though the following description will be explained mainly in reference to 3GPP timed-text streaming, it is noted that the principles underlying this invention may be readily applied to other text streaming systems in mobile communication systems, in which a text and its format descriptions is streamed.

FIG. 1 shows an overview of the system architecture according to an embodiment of the present invention. The streaming server 100 provides a streamed formatted text to the mobile client 101. In the exemplary architecture shown, the streamed data are passed through the Internet, i.e. via an IP based network (Internet) before they enter a wireless network, such as the UMTS 102. In the example shown, the GGSN 105 (Gateway GPRS Support Node) represents the gateway connecting the UMTS core network (CN) 103 to the Internet. The data are passed through the CN 103 (via Serving GPRS Support Node is SGSN 106) and through the access network, here UTRAN 104, to the mobile client 101 via an air interface. The dotted arrow in the figure indicates the streamed data's delivery to the mobile client 101 through CN 103 and UTRAN 104. It should be noted that the present invention is not restricted to the embodiment shown in FIG. 1. The streaming server may e.g. also be located within the UMTS network 102, data do not necessarily have to be delivered via an IP based network, other mobile communication systems than UMTS may be used, etc.

According to one aspect of the present invention, the streaming server 100 may keep a list of transmitted packets and some record of the sample description information entries sent in each RTP packet e.g. a list of SIDX values sent in each packet). Having this maintained information available, the streaming server 100 may compare the sample descriptions of the text samples currently processed for transmission with those included in transmitted data packets. The client may provide feedback to the server for these data packets to avoid a retransmission of these sample format descriptions. Further, the client may elaborate a list of received sample description entries and store their corresponding sample description values. This record of received sample entries may have a minimum lifetime equal to the duration of the streaming session.

The following table will give an example for the list or information maintained by the streaming server 100 in order to determine the association between sample identifiers SIDX, sample descriptions and data packets in which the sample descriptions are/have been transmitted.

| sample identifier SIDX# | sample description | RTP packets | TX status | ACK |
|---|---|---|---|---|
| SIDX#1 | SPLATTR#1 | SN#1 | TX | yes |
| SIDX#2 | SPLATTR#2 | SN#2 | TX | yes |
| SIDX#3 | SPLATTR#3 | SN#2 | TX | yes |
| SIDX#4 | SPLATTR#4 | SN#3 | TX | no |
| SIDX#5 | SPLATTR#5 | SN#3, SN#4 | TX | no |
| ... | ... | ... | ... | ... |
| SIDX#N | SPLATTR#N | SN#Y | PENDING | no |

The information gathered by the streaming server 100 on provided sample descriptions may comprise the sample description and the RTP packets in which same have or are about to be transmitted to the mobile client 101. Moreover, the information may further comprise a sample identifier which facilitates the mapping between sample descriptions and text samples. Further, in another embodiment of the present invention, the information maintained may further indicate whether all RTP packets carrying the sample descriptions have been transmitted (TX) or whether same are pending for retransmission, i.e. are currently prepared for transmission. Additionally, the acknowledgement status (ACK) of data packets in which the sample descriptions have been transmitted may be also indicated.

The example given in the table above illustrates that e.g. the sample description SPLATTR#1 and has an associated sample identifier SIDX#1. Further, the sample description has been transmitted in a single RTP packet identified e.g. by its sequence number SN#1 to the client. According to the acknowledgement status the data packet SN#1 has been transmitted and successfully received by the client. Hence, a sample description of a new text sample to be transmitted by the streaming server 100 providing the same sample description as SPLATTR#1 does not have to be transmitted by the server again.

Taking the next sample descriptions SPLATTR#2 and SPLATTR#3 as an example, same have been transmitted in one RTP data packet (SN#2). Further, this data packet has also been transmitted and acknowledged by the client. This example shows that also plural sample descriptions may be transmitted in one RTP data packet.

Next, sample description SPLATTR#4 has been transmitted in a single data packet (SN#3) which has not yet been acknowledged by the client. In case a sample description identical to SPLATTR#4 is provided for a new text sample to be transmitted, the streaming server 100 may (re)transmit the sample description again, since the data packet in which it has been transmitted to the client has not been acknowledged.

Alternatively, according to another embodiment of this invention, the streaming server 100 may not retransmit the sample description again, assuming that all packets will be successfully received by the client, i.e. also the RTP packets identified by SN#3 will be successfully received. Nevertheless, it should be noted that when delivering data streams in a packed switched network as the Internet, it may not be ensured that data packets arrive at the client in the order in which they have been transmitted by the server. Hence, in this embodiment a sample description transmitted prior to a text sample using the sample description may—in theory—arrive at the receiving client later than the text sample.

Considering the sample description SPLATTR#5, the table above illustrates that the sample description has been transmitted split into two data packets, SN#3 and SN#4. Both RTP packets have been transmitted, but since at least the packet SN#3 has not been acknowledged, the sample description may not be considered available by the server.

Further, taking the sample description SPLATTR#X it is noted that this description is identified by the sample identifier SIDX#X. Further, the data packet SN#Y in which the sample description is comprised is currently pending for transmission (PENDING). Hence, the RTP packet may be a packet that has been queued by the server for transmission or may be a RTP packet that is currently composed by the streaming server 100, i.e. a data packet that is currently filled with information.

In case data packet SN#Y has already been built but is still pending for transmission, there may be two possibilities for the streaming server 100 to act it may either assume that the data packet SN#Y may successfully received and omit the transmission of the same sample description for a new text sample using it, or may add the sample description to a new RTP packet again when a text sample using the description SPLATTR#X again. Assuming that the sample description SPLATTR#X is comprised in the same RTP packet as a new sample description to be transmitted using the same description, the (re)transmission of the sample description may be omitted for the new text sample.

In order to correctly format the received text samples, the mobile client 101 may maintain a similar list comprising the data of the first two columns of the table above. Maintaining information on sample identifiers and associated sample descriptions may allow the client to provide a mapping of received text samples to the appropriate sample description. The latter may be possible, since each text sample received in the payload of a RTP packet may comprise a sample identifier mapping the received text sample to an associated sample description.

According to a further embodiment of the present invention, both streaming server 100 and the receiving client may implement advanced feedback capabilities, e.g. as described in Ott et al., "Extended RTP Profile for RTCP-based Feedback (RTP/AVPF)" (draft-ietf-avt-rtcp-feedback-07.txt, IETF AVT WG, June 2003) or Friedman et al., "RTP Control Protocol Extended Reports" (draft-ietf-avt-rtcp-report-extns-06.txt, IETF AVT WG, May 2003), both available from http://www.ietf.org. In particular the Loss RLE Report Block in section 4.1 of Friedman's draft and the ACK/NACK Messages of Ott's draft may be used to inform the server about an exact loss/reception trace of data packets, i.e. which were received or lost. By employing these "extensions" to the common RTP protocol, individual packets may be acknowledged, such that a server receiving the acknowledgements may keep track of sample descriptions (text sample format description) transmitted to the client employing the server maintained list as described above.

Hence, provided feedback on successfully received data packets at the client, the streaming server 100 may suppress redundant information in newer RTP packets. The streaming server 100 may check before including a sample description information into RTP packets, if the given sample descriptions have been transmitted in previous RTP packets or whether they have already been added to RTP packets which are about to be transmitted by the streaming server 100. To ensure that a sample description sent in an earlier RTP packet has been already received by the client, the streaming server 100 may further check whether RTP packets carrying such entries have been acknowledged by the client. In the latter case, the inclusion of the entries in the new RTP packet is redundant and thus can be avoided. Otherwise the sample description information entries may be included as proposed in the draft "RTP Payload Format for 3GPP Timed Text" by Rey et al.

In the following an exemplary format for the transmission of text sample format descriptions in a new payload header for RTP, will be discussed in reference to FIG. 2. FIG. 2 shows a SPLDESC (SamPLeDESCription) payload header for RTP according to an embodiment of the present invention. The header comprises an initial entry count field followed by a number of sample identifiers SIDX and sample attribute SPLATTR pairs. Hence, this header may be used to transport text sample format descriptions of text samples to a receiving client. The payload section of a RTP packet comprising this header may optionally comprise at least one text sample. The text sample may be associated to a sample identifier SIDX which maps the text sample to a specific sample description having the same sample identifier SIDX.

The entry count may be an initial sequence of bits which indicates the number of entries in the header. In the example shown, two (0x02) entries may be included in the header (see FIG. 3). An entry may be defined as a pair comprising and SIDX field and an SPLATTR field. The entries may correspond to a particular text sample transmitted to the client.

The SIDX may represent the sample description index or sample identifier which is used to map the sample attributes in the SPLATTR field to one or more text sample. The SPLATRR field may comprise the sample description attributes transmitted in the SPLDESC header. This field may contain the text sample default attributes as e.g. shown in the "tx3 g" sample entry of Annex D.8a.16 in 3GPP TS 26.234. The length of this field may be variable.

Further, the field may contain an initial byte with 1-bit flags. Each flag indicates if the corresponding field is present in the following bits. An example for the SPLATTR field in which all flags are set is shown in FIG. 3 for illustrative purposes. The R (1 bit) may indicate reserved bit, D (1 bit) a displayFlags flag, H (1 bit) a horizontal justification flag, V (1 bit) a vertical justification flag, B (1 bit) a background RGBA color flag, T (1 bit) a default text box flag, S (1 bit) a default style flag, and F (1 bit) a font table flag.

The values for the "displayFlags" field (e.g. 16 bits), may indicate display options of the text: scroll in/out, scroll direction, karaoke or vertical text. If the H(V) bit is set the horizontal(vertical) justification field (8 bits) is present in the SPLATTR field. Further, e.g. four octets (32 bits) may indicate the RGBA background color, if the B bit is set. The order of the octets may be Red, Green, Blue and Alpha (transparency).

If the T bit is set, the default text box field (e.g. 64 bits) is present. This field may comprise four 16-bit values (top, left, bottom, right) that define the position of the text box in pixels relative to the text region origin. An S bit set in the field indicates the presence of a default style box field. To indicate which fields are present an additional byte (see figure above) of flags may be used.

If the F bit is set the font table (variable size, 10 bytes in this example) is present. The font table may comprise an entry count field (16 bits) followed by a number of font entries. A font entry may comprise a font identifier font-ID (16 bits) from the font table, a font-name-length (8 bits providing the length of the font name in bytes, the font name e.g. expressed as a string of 8-bit UTF-8 characters The string may be a comma-separated list of font names to be used as alternative font, in preference order.

As explained in previous sections during a 3GPP Timed Text session, the streaming server 100 may not be aware of the packets received by the client, in a general case. This is not the case if the client implements additional feedback capabilities as discussed above. With these enhanced feedback capabilities the client may be able to inform the server about every single packet that is received. With this piece of information and a list the server keeps of sent SIDX values in each packet it is possible to map the received packets to received SIDXs. The server may then only include those sample descriptions in new data packets that have not been received yet. Hence, the overhead for when sending text sample format descriptions may significantly reduced. A flag byte in the SPLATTR field of the SPLDESC payload header may be set to all-zeros for sample descriptions (or SIDX values) to indicate to a receiving client that the attributed for the sample format have already been received by the client. An example format configuration is illustrated in FIG. 4. Note that for illustrative purposes only, a size of 8 bits for the SIDX field length and entry count field is used.

The entry count field indicated that two entries, i.e. two SIDX-SPLATTR field pairs are included in the header. The SIDX#1 field is related to a sample description with the sample identifier 0x01 that has already been received or is not different from the defaults. This is indicated by setting the SPLATTR field to a predetermined bit combination, e.g. is to set all bits of the field to 0 (SPLATTR#1=0x00). The SIDX#2 field e.g. identifies a sample description with index number 0x02 whose horizontal and vertical justification values differ form the defaults (SPLATTR#1=0x18=00110000$_2$). The two octets (0x00, 0x00) following are set to zero and indicate top left justification (see also FIG. 3).

Moreover, for in-band transmission of text sample description the following rules may be applied to the coding of the fields: SIDX values present in text samples of the RTP payload may be included in a SPLDESC header of the same packet. Hence, in this case the RTP packet not only comprises the text format attributes but also the text sample the attributes belong to. It should be noted that also more than one text sample in the payload may be associated to an SIDX value in the header. The corresponding format of the text samples, i.e. the SPLATTR field contents may be present unless the client has stored the SPLATTR contents for the given SIDX. In the latter case, both SIDX and SPLATTR may be omitted, since the use of extended feedback may allow the streaming server 100 to determine, which RTP packets are received by the client and consequently which text sample format descriptions are available at the mobile client 101s.

All SIDX values present in the SPLDESC header of an RTP packet may be present in at least one of the text samples in the payload.

Additionally the RTP packets may carry only sample descriptions without any text samples. For the latter case and using the same values as above a backwards-compatible structure of the SPLDESC header is shown in FIG. 5.

The entry-count may comprise 7 bits as illustrated. The new F bit may be set to 1 if the RTP packet only carries sample description information without any text samples following. The entry count is identical to the one shown in FIG. 3 if the bit F is set to 0 and thus the RTP packet may both include sample descriptions and its associated text samples, complying with the rules given above.

This optimization of the mechanism for sample description transmission presented may offer the possibility to reduce overhead in RTP packet transmission by informing the streaming server 100 about those pieces of information that the streaming client already possesses and does not have to send again.

It also allows the transmission of sample description information only, without necessarily including the associated text samples. This further allows the server to specially protect or ensure the reception of such important information using repetition schemes or forward error correction techniques as described by Rosenberg et al. in "An RTP Payload Format for Generic Forward Error Correction", RFC 2733, December 1999.

According to a further aspect of the present invention, only a predetermined number of sample identifiers may be used. This may significantly reduce the buffer size for sample descriptions at the mobile client 101. This may for example be of relevance, if a streamed text uses a large variety of text sample format descriptions. In the latter case the client may have to store all sample descriptions when using the method described above. To balance the tradeoff between reducing the transmission overhead and increasing the memory needed for the storage of sample descriptions, it may be considered to limit the number of available SIDX values to thereby limit the storage capacity needed for sample descriptions in the client.

According to a further embodiment of the present invention, the streaming server 100 may only use a predetermined number of sample identifiers to map sample descriptions to associated text samples. Assuming that there are N sample identifiers available, the streaming server 100 may need to reuse one of the sample identifiers upon processing a new text sample associated to the N+1$^{th}$ sample description. In this case the streaming server 100 may use different strategies to select the sample identifier to be reused. The simplest scheme would be to reuse the available sample identifiers cyclically. E.g. having using the sample identifiers SIDX#1 to SIDX#N and the sample description of sample identifier SIDX#1 may be overwritten, i.e. reused upon having associated all available identifiers with sample descriptions.

Alternatively, the streaming server 100 may keep information on the latest usage of a sample description, i.e. a sample identifier and may e.g. reuse the sample identifier which has not been used for the longest time interval. Therefore the streaming server 100 may maintain a list of information as shown below.

| sample identifier SIDX# | sample description | RTP packets | timestamp | TX status | ACK |
|---|---|---|---|---|---|
| SIDX#1 | SPLATTR#1 | SN#1 | TS#1 | TX | yes |
| SIDX#2 | SPLATTR#2 | SN#2 | TS#2 | TX | yes |
| SIDX#3 | SPLATTR#3 | SN#2 | TS#2 | TX | yes |
| SIDX#4 | SPLATTR#4 | SN#3 | TS#3 | TX | no |
| SIDX#5 | SPLATTR#5 | SN#3, SN#4 | TS#4 | TX | no |
| ... | ... | ... | ... | ... | ... |
| SIDX#X | SPLATTR#X | SN#Y | TS#X | PENDING | no |

The table above mainly corresponds to the table shown in a previous section. Therefore the description of corresponding elements will be omitted. In the example above X is a predetermined value.

In the table a column indicating the latest usage of the text sample by means of a timestamp have been added. Assuming that TS#2 is the earliest time stamp in the list, the streaming server 100 may reuse SIDX#2 for a new sample description and may update the SPLATTR#2 field with the new sample description, in case there are no other "empty" SIDX identifiers available.

The reuse of a sample identifier may e.g. be established by simply transmitting a new sample description using a used SIDX identifier, i.e. associating the sample identifier to a new description. The selection criteria for the sample identifier to be reused may further consider that text samples associated to the reused sample identifier and which have been transmitted prior to the identifiers reuse should be formatted by the client using the "old" sample description. Hence, a timestamp criterion as explained above may provide a good measure for these situations.

Further, it should be noted that the client may not need to keep track of reuse criteria of sample identifiers. As soon as the client received a sample description together with an associated identifier, the maintained information at the client are updated, i.e. the identifier and the corresponding sample description may be stored independent of whether the sample identifier has already been used or not.

The invention claimed is:

1. A method for transmitting formatted text from a streaming server to a client using a Real-time Transport Protocol (RTP) in a communication system, wherein the formatted text comprises a plurality of text samples that are associated with at least one text sample format description, and wherein the at least one text sample format description is signaled in-band to the client, the method being performed by the streaming server and comprising:

determining whether a text sample format description for a particular text sample to be added to at least one data packet is already included in the at least one data packet for another text sample within the at least one data packet, wherein the at least one data packet is to be transmitted to the client during a given communication session, if the text sample format description for said particular text sample to be added to the at least one data packet is already included in the at least one data packet, adding said particular text sample to the at least one data packet without adding the text sample format description for said particular text sample, if the text sample format description for said particular text sample to be added to the at least one data packet is not already included in the at least one data packet, determining whether the text sample format description for said particular text sample has already been provided to the client for another earlier text sample by being included in a previously transmitted data packet in said communication session, if the text sample format description for said particular text sample has already been provided to the client for another earlier text sample by being included in a previously transmitted data packet in said communication session, adding said particular text sample to the at least one data packet without adding the text sample format description for said particular text sample, if the text sample format description for said particular text sample is not already included in said at least one data packet for another text sample within the at least one data packet and has not already been provided to the client for another earlier text sample by being included in a previously transmitted data packet in said communication session, adding said particular text sample and its text sample format description to the at least one data packet, and transmitting the at least one data packet to the client.

2. The method according to claim 1 wherein when the particular text sample is added to the at least one data packet without adding the text sample format description for said particular text sample, at least one sample identifier is added to the at least one data packet, wherein the sample identifier provides a mapping between one of a plurality of text sample format descriptions and said particular text sample.

3. The method according to claim 1, further comprising maintaining information on text sample format descriptions that have been provided to the client.

4. The method according to claim 3, wherein the maintained information comprises data on the provided text sample format descriptions, data on the at least one data packet in which the text sample format description has been transmitted, and at least one sample identifier.

5. The method according to claim 2, further comprising determining at least one data packet that has been previously transmitted to the client in which the text sample format description for said particular text sample has been transmitted to the client based on maintained information, if it is determined that the text sample format description for said particular text sample has already been provided for the earlier text sample in the previously transmitted data packet.

6. The method according to claim 5, further comprising determining whether the determined at least one data packet has been acknowledged by the client, and if so, reusing the sample identifier used in said determined at least one data packet for mapping said particular text sample to be transmitted to a provided text sample format description.

7. The method according to claim 6, wherein said particular text sample and its text sample format description are added to the at least one data packet to be transmitted to the client, if it has been determined that the determined at least one data packet previously transmitted to the client has not been acknowledged by the client.

8. The method according to claim 6, wherein the at least one data packet comprises a header and a payload section, and wherein the header of a data packet comprises the reused sample identifier, if it has been determined that a text sample format description for a text sample to be transmitted has already been provided for an earlier text sample.

9. The method according to claim 1, wherein the at least one data packet to be transmitted to the client comprises multiple text samples and one or more associated text sample format descriptions.

10. The method according to claim 1, wherein a header of each data packet comprises at least one sample identifier and at least one text sample format description, if it has been determined that the text sample format description for said text sample has not already been provided for an earlier text sample.

11. The method according to claim 1, wherein a header of the data packet comprises at least one sample identifier, if it has been determined that the text sample format description for said text sample has already been provided for an earlier text sample.

12. The method according to claim 1, wherein the at least one data packet comprises a header and a payload section.

13. The method according to claim 12, wherein the payload section comprises at least one sample identifier and at least one of the plurality of text samples.

14. The method according to claim 4, wherein determining whether the text sample format description for said particular text sample has already been provided for an earlier text sample is based on the maintained information.

15. The method according to claim 14, wherein a predetermined, limited number of sample identifiers is available, and a sample identifier is reused for the provision of a new text sample format description and said particular text sample, if it has been determined that the text sample format description for said particular text sample has not already been provided for an earlier text sample and if all available sample identifiers have been used for mapping other text samples to their text sample format descriptions.

16. The method according to claim 15, wherein the maintained information on provided text sample format descriptions is updated upon reuse of a sample identifier.

17. The method according to claim 15, wherein the maintained information further comprises a time stamp for each sample identifier indicating the latest insertion of the sample identifier into a data packet transmitted to the client.

18. The method according to claim 17, further comprising reusing the sample identifier with the earliest time stamp for the transmission of a new text sample format description to the client.

19. The method according to claim 1, wherein the at least one data packet comprises at least one text sample format description only.

20. A streaming server transmitting formatted text to a client via a communication system using a Real-time Transport Protocol (RTP), wherein the formatted text comprises a plurality of text samples that are associated with at least one text sample format description, and wherein the at least one text sample format description is signaled in-band to the client, the streaming server comprising:
a packet forming unit operable to form at least one data packet to be transmitted to the client during a given communication session,
a processing unit operable to determine whether a text sample format description for a particular text sample to be added to the at least one data packet is already included in the at least one data packet for another text sample within the at least one data packet; and
a transmission unit operable to transmit the at least one data packet to the client, wherein:
the packet forming unit is operable to add said particular text sample to the at least one data packet without adding the text sample format description for said particular text sample, if the processing unit has determined that the text sample format description for said particular text sample is already included in the at least one data packet,
the processing unit is further operable to determine whether the text sample format description for said particular text sample has already been provided to the client for another earlier text sample in a previously transmitted data packet during the given communication session, if the text sample format description for said particular text sample to be added to the at least one data packet is not already included in the at least one data packet, and
the packet forming unit is further operable to add the particular text sample to be transmitted to the at least one data packet to be transmitted without adding the text sample format description for said particular text sample, if the processing unit has determined that the text sample format description for said particular text sample has already been provided for an earlier text sample in the previously transmitted data packet during the given communication session, and to add said particular text sample and its text sample format description to the at least one data packet, if the processing unit has determined that the text sample format description for said particular text sample is not already included in said at least one data packet for another text sample within the at least one data packet and has not already been provided for an earlier text sample in the previously transmitted data packet during the given communication session.

21. A method for operating a client in a communication system to receive formatted text from a streaming server using a Real-time Transport Protocol (RIP), wherein the formatted text comprises a plurality of text samples associated with at least one text sample format description, the method being performed by the client and comprising:
receiving a data packet from the streaming server during a given communication session, wherein the data packet comprises at least one text sample,
determining for a particular text sample comprised in the data packet, whether the data packet further comprises an associated text sample format description for the particular text sample,
if the received data packet comprises the associated text sample format description for the particular text sample, selecting the associated text sample format description within the received data packet for the particular text sample,
if the received data packet does not comprise the text sample format description for the particular text sample, determining whether the text sample format description for the particular text sample within the received data packet has been included in a data packet received earlier during the given communication session,
if the text sample format description for the particular text sample has been included in the data packet received earlier during the given communication session, selecting a text sample format description for the particular text sample from the data packet received earlier during the given communication session, and
formatting the particular text sample using the selected text sample format description.

22. The method according to claim 21, wherein the received data packet further comprises at least one sample identifier mapping at least one text sample within the data packet to its text sample format description.

23. The method according to claim 22, further comprising maintaining information on text sample format descriptions provided in data packets that have been received previously.

24. The method according to claim 23, wherein the maintained information comprises data on text sample format descriptions, and their sample identifiers.

25. The method according to claim 21, wherein selecting the associated text sample format description for the respective text sample uses a sample identifier associated with the respective text sample to identify its text sample format description in the received data packet or from text sample format descriptions already available at the client.

26. The method according to claim 23, further comprising updating the maintained information based on a new text sample format description, if the data packet comprises the new text sample format description associated with a sample identifier that is already associated with another text sample format description in the maintained information.

27. The method according to claim 21, further comprising transmitting an acknowledgement for the received data packet to the streaming server.

28. The method according to claim 21, further comprising:
receiving another data packet comprising only at least one text sample format description and
storing the at least one text sample format description received.

29. A client for receiving formatted text from a streaming server using a Real-time Transport Protocol (RTP), wherein the formatted text comprises a plurality of text samples associated with at least one text sample format description, the client comprising:

a receiving unit operable to receive a data packet from the streaming server during a communication session, wherein the data packet comprises at least one text sample, a processing unit operable to determine for each particular text sample within the data packet, whether the data packet further comprises an associated text sample format description for the particular text sample within the received data packet, and a selection unit operable to select the associated text sample format description within the data packet for the particular text sample, if it is determined by the processing unit that the received data packet includes the associated text sample format description for the particular text sample, wherein:

the processing unit is further operable to determine whether the associated text sample format description for the particular text sample has been included in a data packet received earlier at the client during the given communication session, if the received data packet does not include the associated text sample format description for the particular text sample, the selection unit is further operable to select a text sample format description for the particular text sample within the received data packet from text sample format descriptions already received at the client during the given communication session, if it is determined by the processing unit that the associated text sample format description for the particular text sample has been included in a data packet received earlier during the given communication session, and the client further comprises a text formatting unit operable to format the particular text sample using the selected text sample format description.

\* \* \* \* \*